(12) United States Patent
Pierce

(10) Patent No.: US 11,204,025 B2
(45) Date of Patent: Dec. 21, 2021

(54) GAS COMPRESSION COOLING SYSTEM

(71) Applicant: PC3 TECHNOLOGIES, LLC, Katy, TX (US)

(72) Inventor: Matthew Pierce, Hockley, TX (US)

(73) Assignee: PC3 TECHNOLOGIES, LLC, Katy, TX (US)

( * ) Notice: Subject to any disclaimer, the term of this patent is extended or adjusted under 35 U.S.C. 154(b) by 109 days.

(21) Appl. No.: 16/264,104

(22) Filed: Jan. 31, 2019

(65) Prior Publication Data

US 2019/0257552 A1    Aug. 22, 2019

Related U.S. Application Data

(60) Provisional application No. 62/633,934, filed on Feb. 22, 2018.

(51) Int. Cl.
*F04B 39/06* (2006.01)
*F04B 35/00* (2006.01)
(Continued)

(52) U.S. Cl.
CPC .......... *F04B 39/06* (2013.01); *F04B 25/00* (2013.01); *F04B 35/002* (2013.01); *F04B 39/066* (2013.01); *F28D 1/047* (2013.01); *F28D 1/0417* (2013.01); *F05B 2260/211* (2013.01); *F05B 2270/325* (2013.01); *F17C 2221/033* (2013.01);
(Continued)

(58) Field of Classification Search
CPC ........ F04B 39/06; F04B 39/066; F04B 25/00; F04B 25/04; F04B 25/005; F04B 41/00; F28B 1/047; F28B 1/04; F28B 1/0417; F28B 2500/072; F05B 2260/211; F05B 2270/325; Y02P 80/10; F17C 2221/033;
(Continued)

(56) References Cited

U.S. PATENT DOCUMENTS 4,362,462 A * 12/1982 Blotenberg ......... F04D 29/5833 415/1
4,462,813 A * 7/1984 May .......................... C07C 7/09 62/613

(Continued)

*Primary Examiner* — Charles G Freay
(74) *Attorney, Agent, or Firm* — Dinsmore & Shohl LLP; Monika L'Orsa Jaensson, Esq.

(57) ABSTRACT

A multi-stage gas compression system useful at the production site and at central collection points, having an energy efficient and effective intercooler system. The system includes a reciprocating compressor having a plurality of compressor valves and cylinders configured in series to provide staged compression to the natural gas. Coupled with the compressor are an inlet port for receiving natural gas to be compressed, and an outlet port for delivering compressed fluid from the compressor to a discharge line, to the transmission pipeline or storage. Facilitating transmission and intercooling of the natural gas between cylinders are a plurality of pipes, each pipe in close proximity with an intercooler. The rate of cooling of the intercooler is determined by a control system coupled therewith, including a temperature sensor positioned within pipe proximal to the intercooler, and means to compare the temperature measured by the temperature sensor and an optimal temperature or temperature range, and determine appropriate levels of cooling provided by the intercooler.

16 Claims, 5 Drawing Sheets

(51) Int. Cl.
  *F04B 25/00*   (2006.01)
  *F28D 1/047*   (2006.01)
  *F28D 1/04*    (2006.01)

(52) U.S. Cl.
  CPC   *F17C 2227/0164* (2013.01); *F17C 2227/039* (2013.01); *F17C 2227/0346* (2013.01); *F25B 2400/072* (2013.01)

(58) Field of Classification Search
  CPC ...... F17C 2227/0164; F17C 2227/0346; F17C 2227/039
  USPC ......... 164/85, 148, 150, 151, 173, 244, 299; 417/248
  See application file for complete search history.

(56) References Cited

U.S. PATENT DOCUMENTS

| | | | |
|---|---|---|---|
| 5,476,430 A * | 12/1995 | Lee | A63B 22/02 482/3 |
| 8,128,379 B2 * | 3/2012 | Hritz | F04B 53/08 417/228 |
| 8,813,503 B2 | 8/2014 | Jones | |
| 9,003,763 B2 | 8/2015 | Coney | |
| 9,404,623 B2 | 8/2016 | Kapoor | |
| 10,619,462 B2 * | 4/2020 | Elmer | F28D 1/0472 |
| 2008/0008602 A1 * | 1/2008 | Pozivil | F17C 9/00 417/243 |
| 2014/0151015 A1 * | 6/2014 | Sun | F25B 1/10 165/253 |

\* cited by examiner

GAS COMPRESSION COOLING SYSTEM

BACKGROUND

The disclosed technology regards a multi-stage gas compression system useful at the production site and at central collection points of a natural gas gathering system, having an energy-efficient and effective intercooler system. The disclosed technology further regards an intercooler useful in a multi-stage gas compression system.

In a natural gas gathering system, gathering lines are used to transport natural gas from the production site (wellhead) to a central collection point. They generally operate at relatively low pressures and flow, and are smaller in diameter than transmission lines. Multiple compressor systems are used throughout the gathering system to gather the natural gas and transmit it to a common storage or pipeline.

Compressor systems used in natural gas gathering typically include a multi-stage gas compressor, wherein the gas is compressed in a plurality of stages. Typically, the compression ratio in any stage is no more than 4 to 1. Since compression raises the temperature of the gas to the range of 90° F. to 280° F., for example, the compressed gas needs to be cooled between stages for effective compression at the next compression stage. Therefore it is standard to transmit the gas through a centrally positioned intercooler to remove heat from the gas, and allow effective compression at the next compression stage.

This intercooler of the prior art is typically a single fan powered by a central engine (with, in some embodiments, an alternator coupled with the engine) providing energy to the compressor system. To control the amount of cooling provided by the intercooler, structural elements such as louvers are incorporated into the housing of the intercooler, which can be manually adjusted. By such methods the intercooler expends the same amount of energy, but at times only a portion of the cooling generated by the intercooler is used to cool the gas (the rest wasted). Further, the central positioning of the intercoolers provide cooling between all stages of compression at the same rate, and while such a configuration may provide some effectiveness in gas compression and efficiencies in system manufacture and maintenance, it also expends a significant amount of energy, and does not allow variable cooling between different stages of compression.

Therefore, there is a need for a multi-stage gas compression system with an energy-efficient and more effective intercooler system, providing a differentiable and adjustable exchange of thermal energy between each compression stage. Similarly, there is a need for an intercooler useful with a multi-stage gas compression system, providing for a unique and automatically adjustable exchange of thermal energy between each compression stage of the system.

GENERAL DESCRIPTION

The disclosed technology regards a multi-stage gas compression system useful at the production site and at central collection points, having an energy-efficient and effective intercooler system, providing a differentiable and adjustable exchange of thermal energy between each compression stage. The disclosed technology further regards an automatically adjustable intercooler useful in a multi-stage gas compression system.

The gas compression system of the disclosed technology includes a reciprocating compressor having a plurality of cylinder valves and cylinders, the cylinders being configured in series to provide staged compression of the natural gas. Coupled with the reciprocating compressor is an inlet port for receiving natural gas to be compressed from a suction line, and an outlet port for delivering compressed fluid from the compressor to a discharge line, and on to the transmission pipeline or storage.

Pipes are coupled respectively with and between the cylinders of the reciprocating compressor, facilitating the transmission and cooling of natural gas between each cylinder. Positioned near each pipe is an independently controlled intercooler to provide effective cooling to the natural gas flowing through the associated pipe, the cooling being designed and configured to provide energy efficient enthalpy change in the gas between each compression stage to increase the effectiveness of the next compression stage.

A control system is provided with each intercooler. The control system includes temperature sensors to sense the current temperature in the pipes between each compression stage, and a series of controllers, each controller coupled with one of the intercoolers and designed and configured to compare the temperature between the compression stages with a design temperature or temperature range for the next compression stage, and adjust the cooling provided by the associated intercooler based upon the temperature differential determined by the control system. By this configuration an independently controlled cooling system is provided between each compression stage, maximizing the overall efficiency of the next compression stage, and minimizing the system's overall use of energy.

DESCRIPTION OF THE DRAWINGS

An embodiment of the disclosed technology is illustrated in the accompanying drawings, in which like reference numerals represent like parts throughout, and in which.

DETAILED DESCRIPTION

Figure 1:
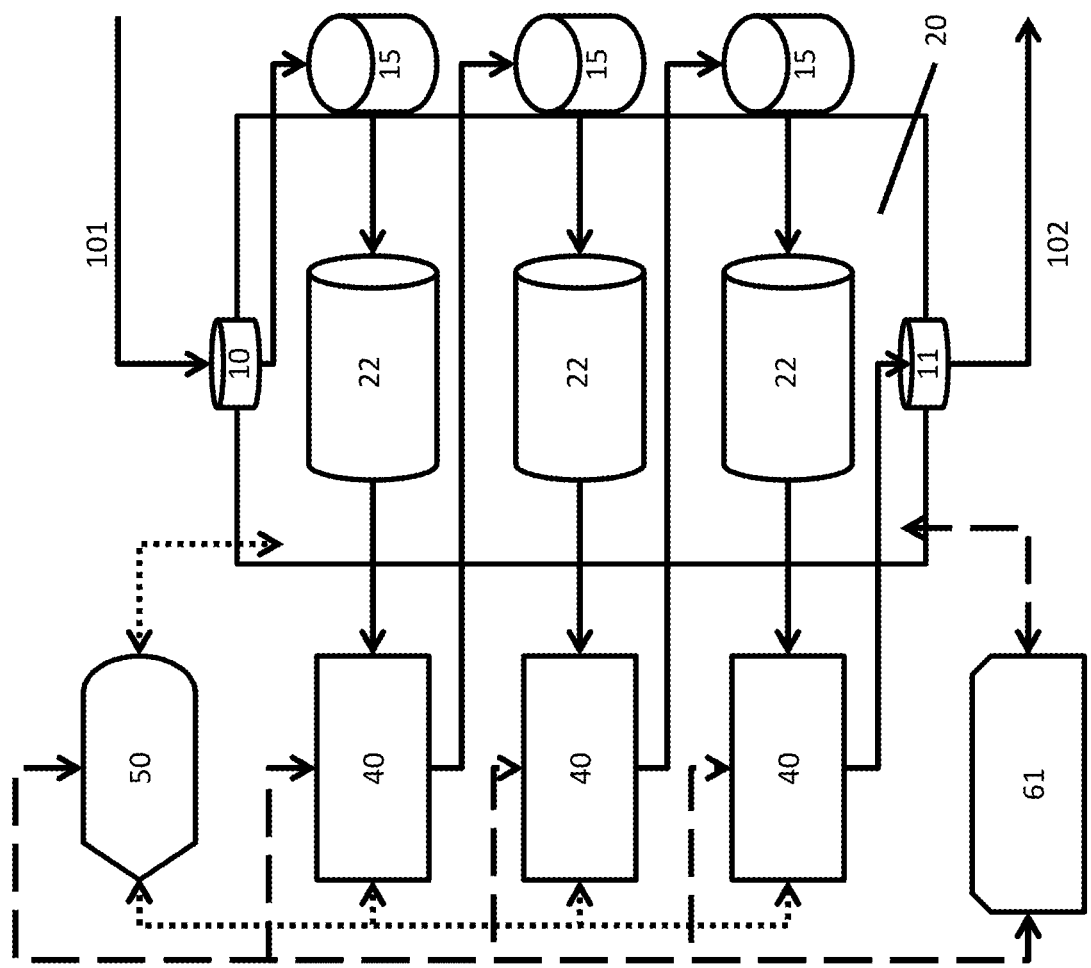
FIG. 1 is a block diagram of the overall system design of an embodiment of the disclosed technology.
Figure 2:
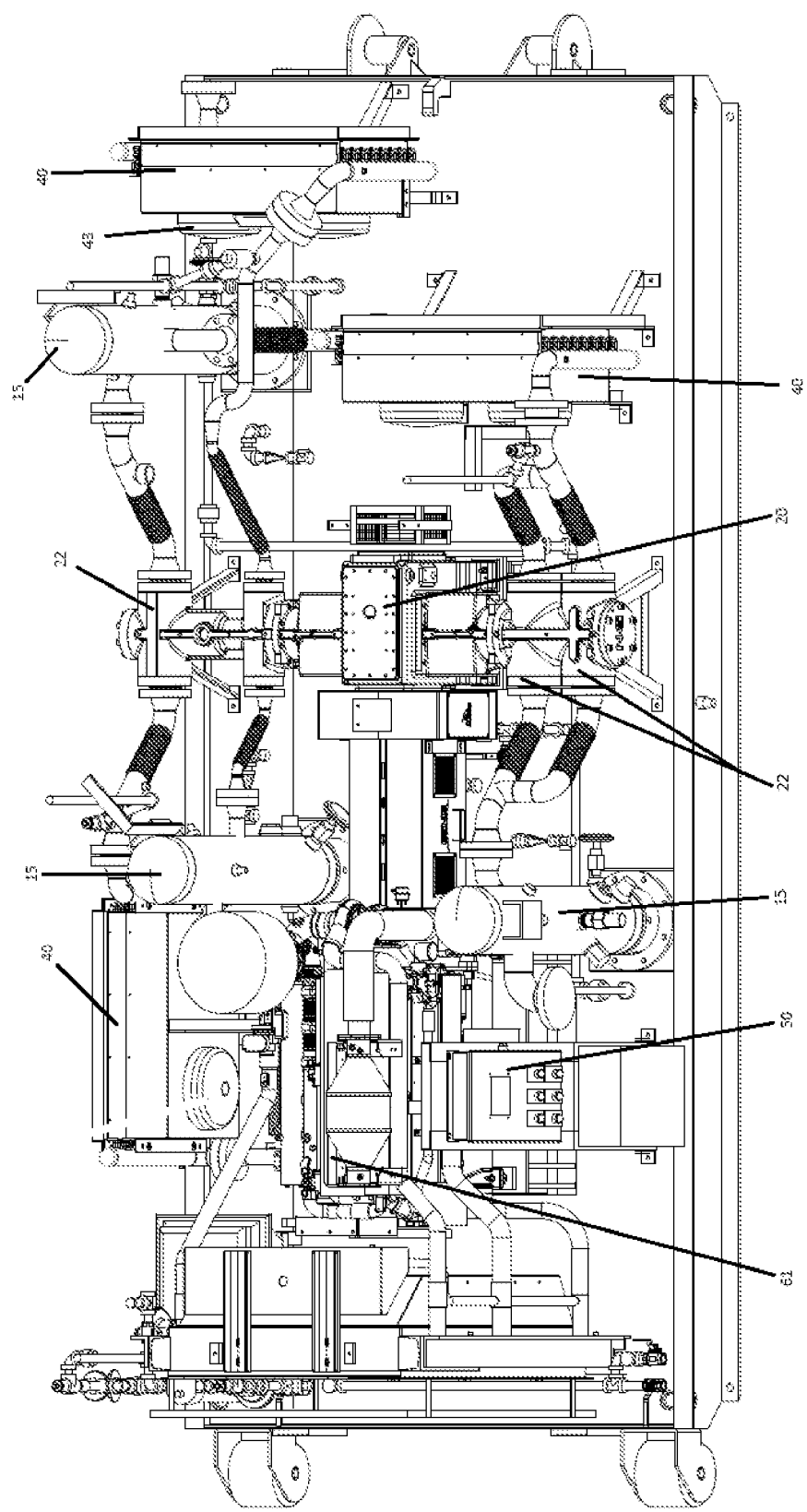
FIG. 2 is a perspective view of an embodiment of a multi-stage gas compression system, incorporating the disclosed technology.

As shown in the Figures, an embodiment of a multi-stage gas compression system 1 of the disclosed technology is provided. The system includes a multi-stage reciprocating compressor 20 that includes a plurality of cylinders 22, each cylinder having a piston driven by a crankshaft to deliver gases at a higher pressure to the next compression stage. The cylinders of the compression system are configured in series to provide a flow pattern for staged compression of the natural gas. Valves control inflow and outflow from each cylinder. Coupled with the reciprocating compressor is an inlet port 10 for receiving natural gas to be compressed from a suction line 101, and an outlet port 11 for delivering compressed fluid from the compressor to a discharge line 102 and on to the transmission pipeline or storage. A liquid catching vessel or scrubber 15 may be positioned before each or any of the cylinders to capture and remove liquid gas and any other liquids present in the gas. In the embodiment shown in FIG. 1, the compressor 20 includes three compressor cylinders 22; however, the system may be designed to have more or less compressor cylinders, depending on the design pressure of the gas as supplied to the compression system, and the design pressure of the gas to be received from the compression system.

A plurality of pipes 30 are coupled respectively with and between the cylinders of the reciprocating compressor, establishing the flow pattern of the system and facilitating the transmission and cooling of natural gas between each compression stage. Further, the system of the disclosed technology includes a plurality of intercoolers 40, each intercooler being independently operable, and positioned in proximity of one of the pipes to provide distinct cooling to the natural gas flowing through the pipe.

When configured at the wellhead or at central collection points, natural gas may be received by the compression system of the disclosed technology at pressures ranging between about 10-75 psi, and the compression system of the disclosed technology may compress the gas for delivery to the transmission pipeline or storage at pressures ranging from between about 600-1400 psi. Typically, the compression ratio in any compression stage is no more than 4 to 1. In an exemplary embodiment, the compression system of the disclosed technology includes three compression stages, wherein the intercooler between each stage cools the natural gas to about 120° F. with pressures as set forth in the Table 1 below:

TABLE 1

| Compression Stage | Inlet Pressure | Outlet Pressure | Compression Ratio | Temp after Compression | Temp after Cooling |
| --- | --- | --- | --- | --- | --- |
| 1 | 35 psig | 165 psig | 3.8 | 265° F. | 120° F. |
| 2 | 165 psig | 456 psig | 2.7 | 250° F. | 120° F. |
| 3 | 456 psig | 1050 psig | 2.3 | 250° F. | 120° F. |

In this exemplary embodiment, the gas is delivered to the transmission line at about 1000-1050 psi, depending on other components of the gas compression system that may reduce the pressure of the gas (e.g., dehydration units, separation units, etc.). Notably, the temperature set point to which the gas is cooled between each compression stage and after the last compression stage (120° F. in this example) may be adjusted by means of the disclosed technology.

Reciprocating compressors suitable for use in the disclosed technology include high speed natural gas reciprocating compressors, e.g. between 150-2000 hp. Generally, the cylinders in these systems each include an inlet cylinder valve at the inlet port and an outlet cylinder valve at the outlet port, for example check valves, plate valves and poppet valves, and a reciprocating piston, all supported within a housing. For purposes of this disclosure and the claims recited hereinafter, the term "cylinder" is intended to include these or similar components, which are designed to compress the gas within the cylinder and transport gas to and from the cylinder.

Each of the pipes 30 of the disclosed technology is coupled with an outlet cylinder valve of one cylinder and an inlet cylinder valve of a subsequent cylinder in the flow pattern of the system, thereby allowing the flow of natural gas from one cylinder to another in the staged compression cycle. The pipes may be, for example, 1.25", 2", 3" or 4" diameter pipes, made from carbon steel (commonly known as spool pieces), flexible stainless steel corrugated pipe, or similar pipes.

After each compression stage and before the subsequent compression stage, an intercooler 40 is positioned in proximity of each of the pipes 30 to provide cooling to the natural gas in the pipe by, for example, moving air along the exterior surface of the proximal pipe. In the embodiment shown in FIGS. 1, 2 and 3 and 4, the intercoolers 40 are each one or more variable speed, independently controlled fans, such as a 12" or 19" electric motor fan 43 which receives a control signal directing the fan to operate at a certain rotational speed, the intercoolers being positioned in proximity to the associated pipe to move air along the exterior surface of the pipe, thereby increasing the rate of removal of heat from the exterior surface of the pipe. By their independent control, the amount of cooling provided to the natural gas between each stage of compression can be independently configured and adjusted for maximum energy efficiency and compression effectiveness, as hereinafter described.

The fans of the intercoolers may be powered by an electric motor 41, receiving energy from for example a 24 volt battery (or two 12 volt batteries), or may be powered by the compression system engine 61, wherein an alternator directs energy from the engine to the compression cylinders and the intercoolers, or other energy sources such as power supplies or existing onsite power at the oilfield location or compressor pad. In some embodiments the amount of power supplied to the fan by the motor determines the rotational speed of the fan blades, and thereby controls the amount and speed of air flowing across the exterior surface of the proximal pipe at any given time, which is in direct correlation with the rate of thermal energy removed from the pipe surface and the natural gas flowing therein. In some embodiments a control signal is generated and sent to the fan to set the rotational speed of the fan. Other means for controlling rotational speed of the fan blades may also be provided.

Figure 3:
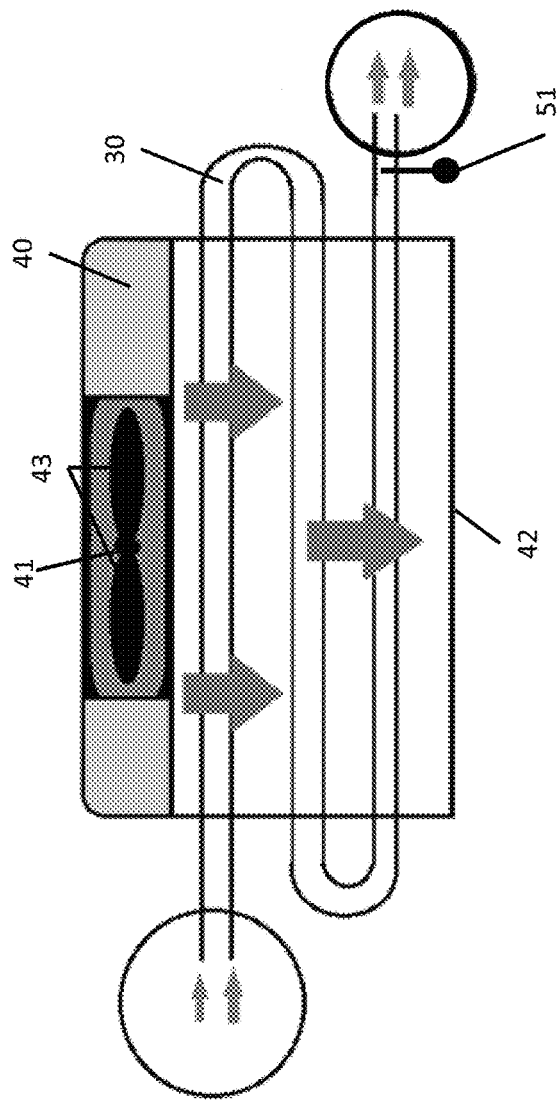
FIG. 3 is a top view of an embodiment of the housing supporting the intercooler and associated piping of the disclosed technology, between compression stages.
Figure 6B:
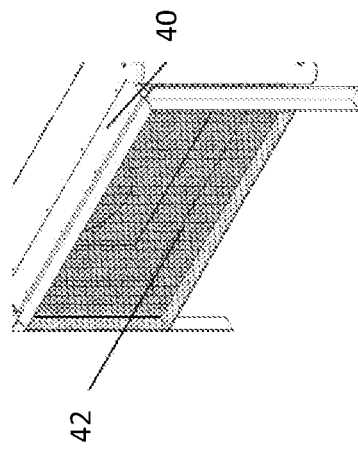
FIGS. 6A and 6B are front and back views, respectively, of an embodiment of the housing to support the intercooler of the disclosed technology.
Figure 6A:
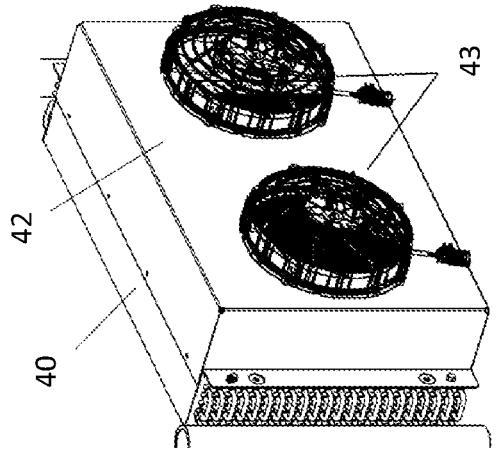

The fans 40, electric DC motor 41 and associated pipe 30 may be supported within housing 42 (see, e.g. FIGS. 3, 6A and 6B). As shown in this embodiment, the pipe 30 may be configured in a multi-pass flow pattern within the housing. The housing 42 is designed and configured to facilitate abundant airflow therethrough, thereby allowing ambient air to flow into the housing, and heat air to flow out of the housing. In an exemplary embodiment, as shown in FIGS. 6A and 6B, the housing supports the fan in an aperture on one side wall (FIG. 6A), and the opposing side wall (FIG. 6B) is perforated or ventilated.

Figure 4:
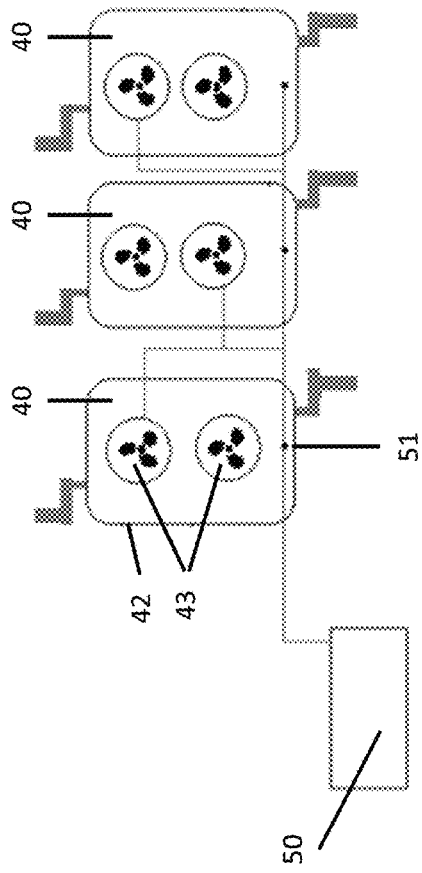
FIG. 4 is a diagram of an embodiment of the control system electrically coupled with the intercoolers of the disclosed technology.
Figure 5:
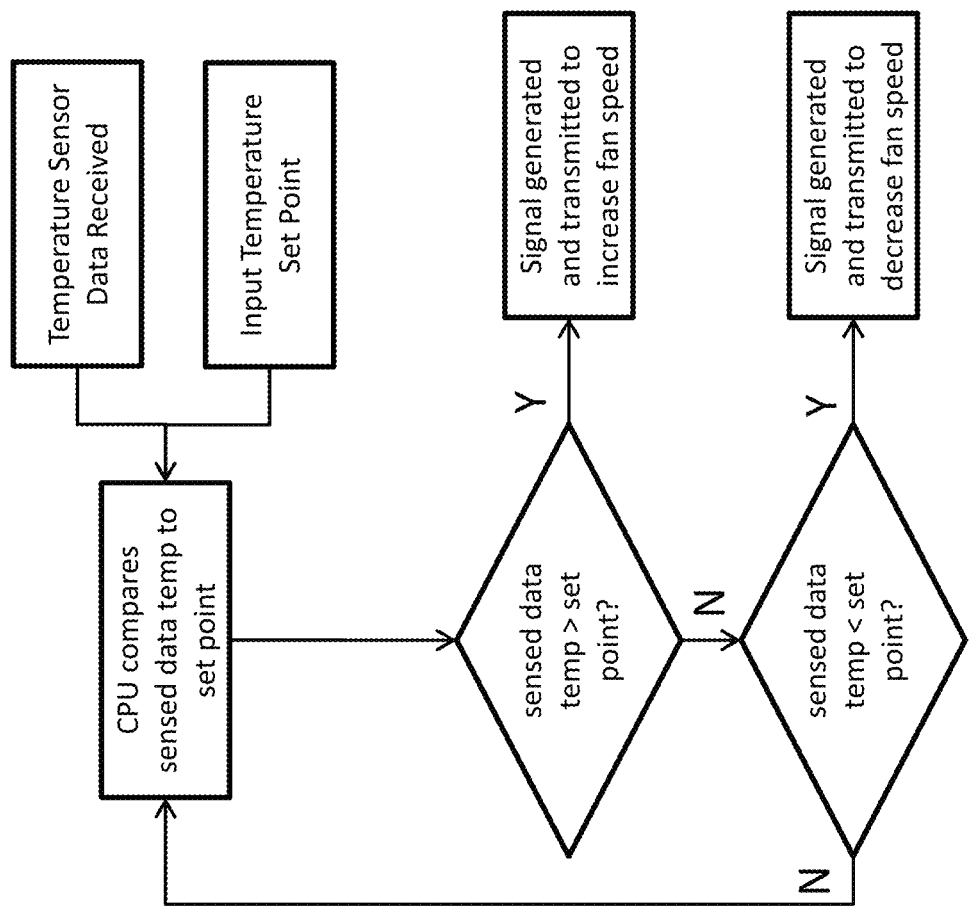
FIG. 5 is a flowchart of an embodiment of the processes of the control system and associated elements of the disclosed technology.

In the embodiments disclosed, and as depicted in FIGS. 1, 4 and 5, independent control of each of the intercoolers (rotational speed of the fan blades, for example) in each compression stage is provided by a control system 50. The control system includes a plurality of temperature sensors 51 coupled with each of the pipes 30 to measure the current temperature over time of the natural gas in the pipe, and generate and transmit signals representing the measured temperature. The temperature sensors 51 may be transducers, positioned within the pipe, at various locations between cylinders, such as, for example, in the portion of the pipe exiting the housing, after the natural gas has passed through the cooling stage provided by the intercooler. One or more other positions along the length of the pipe may also be suitable, for example in the portion of the pipe exiting the cylinder, and/or in portions of the pipe within the housing of the intercooler.

The control system 50 further includes means to receive and compare the measurements of temperature to an optimal temperature or temperature range (also described as input temperature set point) for the next subsequent compression stage based upon various factors, including for example the specific gravity of the gas, the number of compression stages, the pressure of the gas received by the system, and the desired pressure of the gas transmitted by the system (hereinafter referred to as the optimal temperature, acknowledging that this may be a range of temperatures). Because the set point (which may be a single temperature, or a range of temperatures) varies based upon operating conditions and these other factors, the set point for each stage of compression may be set and changed by a user, at for example a user interface. The control system further includes means to generate a signal based upon at least some of the temperature differential comparisons and transmit the signal to the intercooler leading to the compression stage. The signal generated by the control system may, for example, by adjusting the fan speed direct the intercooler to: (i) provide additional cooling if the measured temperature exceeds the optimal temperature, (ii) decrease the cooling if the temperature is below the optimal temperature, and (iii) cease cooling based upon a significant temperature differential. An example of the processing of the control system for one intercooler in the system of the disclosed technology is shown in FIG. 5, wherein the CPU or similar processor compares the sensed temperature from the temperature sensors to the temperature set point, and determines whether the sensed temperature is above the set point (and if so, sends a signal to the intercooler to increase the fan speed) or below the set point (and if so, sends a signal to the intercooler to decrease the fan speed); if neither condition is present, the sensed temperature must be at the set point, and the fan speed is maintained. This processing is repeated for other intercoolers in the system, using temperatures sensed from the respective intercoolers, and the same or different set points, as determined by the user.

This signal control means may include a plurality of proportional, integral and differential (PID) loop process control systems coupled with temperature sensors. In this embodiment, each process control system receives one or more signals from the temperature sensor(s) between compression stages, and transmits signals to the intercooler between the same compression stages, to adjust the amount of cooling provided by the intercooler to the pipe. The signal generated and transmitted by the process control system may be received by the electric fan of the intercooler, wherein the rotational speed of the fan is adjusted based upon the signal received. In some embodiments, the signal is received by the electric motor associated with the fan, controlling the power delivered to the fan (and thereby the rotational speed of the fan). In colder climates, the housing 42 may be positioned near the compressor and/or the engine, so that warm air from the intercooler may be blown towards these units. In these embodiments, the signal control means may continue to signal the fan(s) to continue to run even at or below the set point so that the warm air may be provided to the other components of the system. Other electronics and mechanical elements within the intercooler may receive the signal and control the power generated by the fan motor, the rotational speed of the fan, or otherwise control the amount of cooling provided by the intercooler at any given time.

Figure 7:
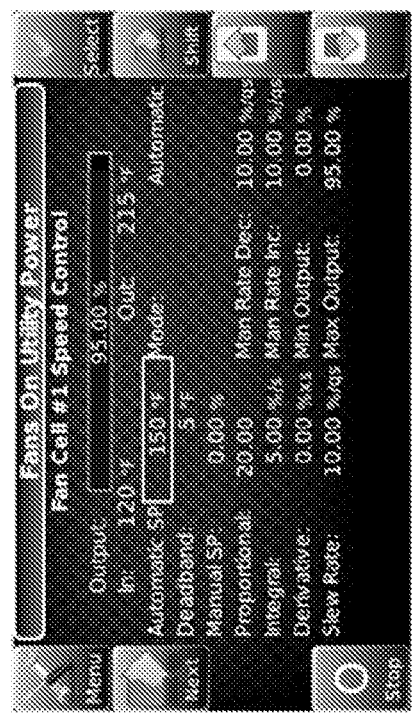
FIG. 7 is a view of a user interface useful in controlling the intercoolers of the disclosed technology.

An exemplary formula for the PID loop process control systems is:

$$u(t) = K_p e(t) + K_i \int_0^t e(\tau)d\tau + K_d \frac{d}{dt}e(t)$$

wherein e=error or distance the measured temperature value is away from a desired temperature, u=output or signal to the fans, $K_p$=Proportional coefficient, $K_i$=Integral coefficient and $K_d$=Derivative coefficient. These coefficients may be set by the user at a user interface (as shown in FIG. 7, exemplary coefficients may be a proportional coefficient of 20, an integral coefficient of 5, and a derivative coefficient of 0).

Signals communicated to and within the control system and with the intercooler may be communicated via wire, or wirelessly via Bluetooth and other communication methods. The optimal temperature or temperature range and other control configurations may also be set by an operator with an input means (e.g., computer program which collects information regarding the compression system and the intercoolers, or a similarly enabled application on a smartphone or otherwise, or by simple electronics with a user interface, or even less sophisticated equipment such as rotatable knobs), and using wires or wireless communication methods, even wireless communication remote from the compression system. An exemplary user interface is provided in FIG. 7.

While the disclosed technology was designed for use with multi-stage gas compression system useful at the production site and at central collection points of a natural gas gathering system, its application may apply to other gas compression systems.

Although this description contains many specifics, these should not be construed as limiting the scope of the invention but as merely providing illustrations of some of the embodiments thereof. The disclosed technology is susceptible to various modifications and adaptations, and the same are intended to be comprehended within the meaning and range of equivalents of the appended claims.

The invention claimed is:

1. A multi-stage gas compression system for compression of gas at the production site of a natural gas well or at central collection points of a natural gas gathering system, the system comprising:
    an inlet port for receiving natural gas to be compressed, a reciprocating compressor, and an outlet port for delivering compressed natural gas from the reciprocating compressor to a discharge line;
    the reciprocating compressor comprising a plurality of cylinders, each cylinder comprising an inlet cylinder valve and an outlet cylinder valve, the cylinders being configured in series to provide a flow pattern for staged compression of the natural gas, between the inlet port and the outlet port;
    a plurality of intercoolers, each intercooler comprising:
        a pipe having an exterior surface and being coupled with an outlet cylinder valve of one cylinder and an inlet cylinder valve of another cylinder for conveying the natural gas from one cylinder to another cylinder, in the flow pattern;
        a variable speed, independently controlled fan, positioned in proximity of the intercooler pipe to provide cooling to the natural gas in the pipe, which fan is powered by a compression system engine which also supplies energy to the compressor;

wherein each intercooler moves air along the exterior surface of the pipe resulting in an adjustable rate of cooling differentiable among the intercoolers;

a control system coupled with the intercoolers, the control system comprising a plurality of temperature sensors, each temperature sensor being coupled with the pipe of one of the intercoolers, respectively, to measure the temperature of the natural gas in the pipe and generate and transmit measured temperature signals representing the measured temperature of the natural gas in the pipe of the respective intercooler, wherein the control system receives and compares the measured temperature signal from each of the temperature sensors to an optimal temperature or temperature range for the respective intercooler, generates a control signal based upon the comparison and transmits the control signal to the respective intercooler; and wherein each of the intercoolers receives the respective control signal from the control system and adjusts the voltage supplied to the fan of the intercooler, resulting in a change in the rotational blade speed of the fan in direct proportion to the voltage supplied to the fan, thereby adjusting the rate of cooling provided by the intercooler based upon the control signal received by the intercooler.

2. The multi-stage gas compression system of claim 1, wherein an electric motor receives the voltage supplied to the fan.

3. The multi-stage gas compression system of claim 1, wherein each of the intercoolers further comprises a housing to support the fan, and a portion of the proximal pipe of the respective intercooler.

4. The multi-stage gas compression system of claim 3, wherein the pipe of each intercooler is configured in a multi-pass flow pattern within the housing.

5. The multi-stage gas compression system of claim 3, wherein the fan of each intercooler is supported by the housing through an aperture on a side wall, and an opposing side wall of the housing is perforated, to facilitate airflow therethrough, thereby allowing ambient air to flow into the housing, and heated air to flow out of the housing.

6. The multi-stage gas compression system of claim 1, wherein the temperature sensors are transducers, positioned within the pipe of each intercooler.

7. The multi-stage gas compression system of claim 1, wherein the control system comprises a plurality of proportional, integral and differential (PID) loop process control systems, each PID loop process control system associated with one of the intercoolers.

8. The multi-stage gas compression system of claim 7, wherein the a control signal generated and transmitted by each PID loop process control system is received by the fan of the respective intercooler.

9. The multi-stage gas compression system of claim 7, wherein a control signal generated and transmitted by each PID loop process control system is received by the respective intercooler and determines the voltage supplied to a motor of the intercooler.

10. An intercooler and control system for cooling natural gas between compression stages in a multi-stage gas compression system, the intercooler comprising a variable speed fan and pipe through which natural gas flows, wherein the fan moves air along an exterior surface of the pipe resulting in an adjustable rate of cooling, and wherein the amount of cooling provided by the intercooler is directed by the control system, the control system being coupled with the intercooler, the control system comprising a temperature sensor to be coupled with the pipe to measure a temperature of natural gas in the pipe and generate and transmit measured temperature signals representing the measured temperature, wherein the control system further receives the measured temperature signals, compares the measured temperature signals to an optimal temperature or temperature range, generates a control signal based upon the comparison and transmits the control signal to the intercooler, wherein the control signal determines a voltage supplied to the fan, thereby adjusting the rate of cooling provided by the intercooler, and wherein the fan is powered by a compression system engine which also supplies energy to a compressor of a multi-stage gas compression system.

11. The intercooler and control system of claim 10, wherein the voltage supplied to the fan determines a rotational blade speed of the fan.

12. The intercooler and control system of claim 10, further comprising a housing to support the fan and a portion of the pipe.

13. The intercooler and control system of claim 12, wherein the pipe is configured in a multi-pass flow pattern within the housing.

14. The intercooler and control system of claim 10, wherein the temperature sensors are transducers, positionable within the pipe.

15. The intercooler and control system of claim 10, wherein the control system comprises a proportional, integral and differential (PID) loop process control system.

16. The intercooler and control system of claim 15, wherein a control signal generated and transmitted by the PID loop process control system is received by the fan.

\* \* \* \* \*